United States Patent
Moore

(10) Patent No.: US 9,492,928 B2
(45) Date of Patent: Nov. 15, 2016

(54) INTERCONNECTED PHALANGES FOR ROBOTIC GRIPPING

(71) Applicant: Toyota Motor Engineering & Manufacturing North America, Inc., Erlanger, KY (US)

(72) Inventor: Douglas A. Moore, Livermore, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/534,049

(22) Filed: Nov. 5, 2014

(65) Prior Publication Data

US 2016/0121489 A1    May 5, 2016

(51) Int. Cl.
   *B25J 15/00*   (2006.01)
   *B25J 9/14*    (2006.01)

(52) U.S. Cl.
   CPC ............ *B25J 15/0009* (2013.01); *B25J 9/142* (2013.01); *Y10S 901/39* (2013.01)

(58) Field of Classification Search
   CPC .................................................. B25J 15/0009
   USPC ................. 294/106, 111; 901/25, 39, 45, 46
   See application file for complete search history.

(56) References Cited

U.S. PATENT DOCUMENTS

| | | | |
|---|---|---|---|
| 5,378,033 A | 1/1995 | Guo et al. | |
| 5,647,723 A * | 7/1997 | Rush | B25J 15/0009 294/111 |
| 5,762,390 A | 6/1998 | Gosselin et al. | |
| 6,896,704 B1 | 5/2005 | Higuchi et al. | |
| 7,445,260 B2 | 11/2008 | Nihei et al. | |
| 7,549,688 B2 | 6/2009 | Hayakawa et al. | |
| 7,766,405 B2 | 8/2010 | Matsuda et al. | |
| 7,795,832 B2 | 9/2010 | Kawabuchi et al. | |
| 8,052,857 B2 * | 11/2011 | Townsend | B25J 9/1612 205/122 |
| 8,141,925 B2 * | 3/2012 | Mizuno | B25J 9/102 294/106 |
| 8,491,666 B2 | 7/2013 | Schulz | |
| 8,504,198 B2 | 8/2013 | Takahashi et al. | |
| 8,562,049 B2 | 10/2013 | Ihrke et al. | |
| 8,662,552 B2 | 3/2014 | Torres-Jara | |
| 8,747,486 B2 | 6/2014 | Kawasaki et al. | |
| 8,936,289 B1 * | 1/2015 | Kozlowski | B25J 15/0009 294/106 |
| 2010/0176615 A1 * | 7/2010 | Okuda | A61F 2/583 294/106 |
| 2012/0112485 A1 * | 5/2012 | Lee | B25J 15/0009 294/213 |
| 2012/0185061 A1 | 7/2012 | Caron L'Ecuyer et al. | |
| 2013/0338796 A1 | 12/2013 | Moyer et al. | |
| 2014/0180477 A1 * | 6/2014 | Chung | B25J 9/1612 700/258 |

FOREIGN PATENT DOCUMENTS

| | | |
|---|---|---|
| CN | 203471788 | 3/2014 |
| JP | 2003165084 | 6/2003 |
| JP | 2004130405 | 4/2004 |
| WO | WO 2013/075245 | 5/2013 |

* cited by examiner

*Primary Examiner* — Paul T Chin
(74) *Attorney, Agent, or Firm* — Snell & Wilmer LLP

(57) ABSTRACT

A robotic gripping device allows for pinch and power grasps using interconnected phalanges with configurable connections. A distal phalange is rotatably connected to a proximal phalange. A contact phalange is rotatably connected to the proximal phalange. The contact phalange is rotatably connected to the distal phalange via a contact-distal pivot or rotation connection. In response to sufficient contact between the contact phalange and an object, the contact phalange is configured to rotate in a first direction toward the proximal phalange. The rotation of the contact phalange causes rotation of the distal phalange in a second direction toward the object. The contact-distal connection may be a configurable gear connection for adjusting the movement ratio of the contact and distal phalanges.

20 Claims, 21 Drawing Sheets

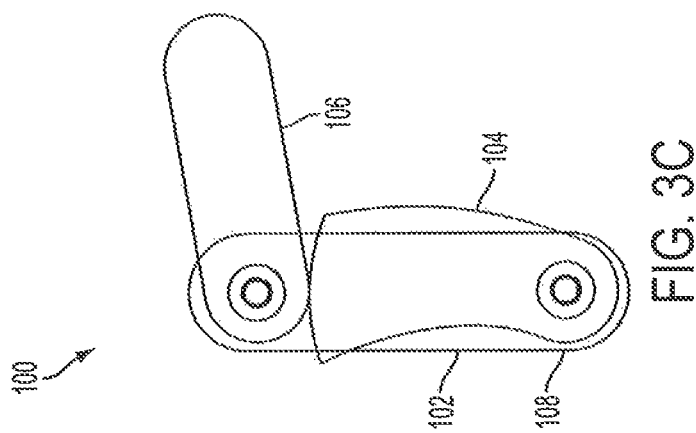
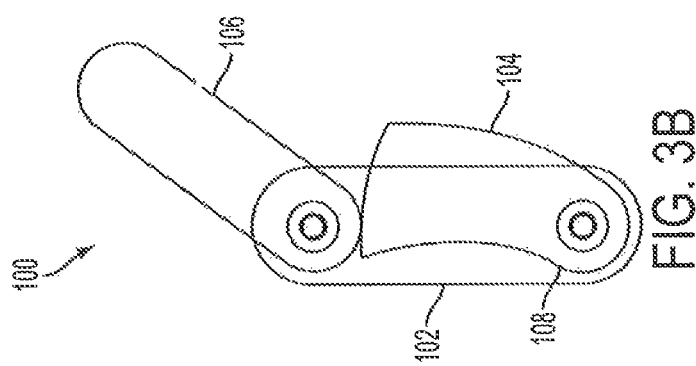
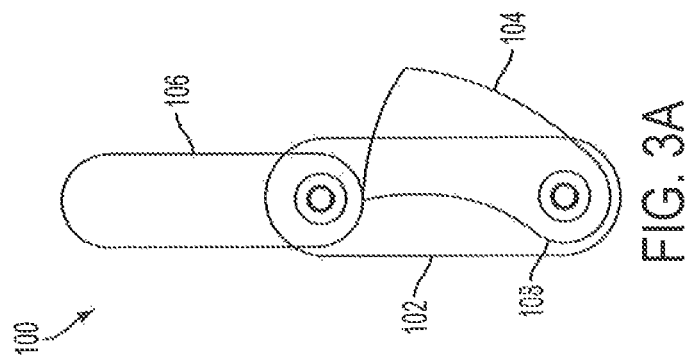

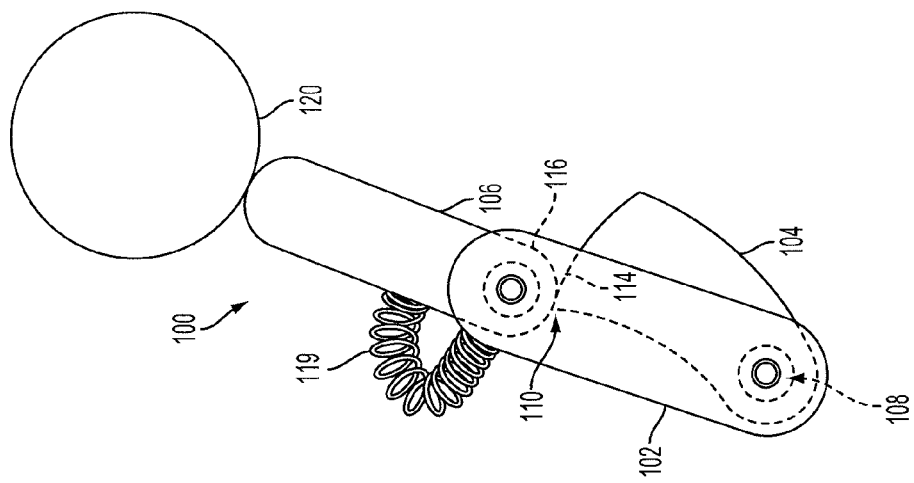
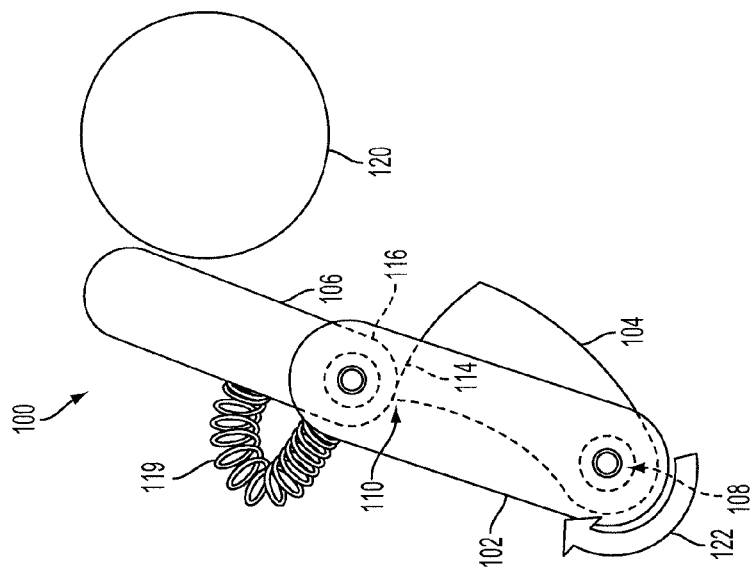
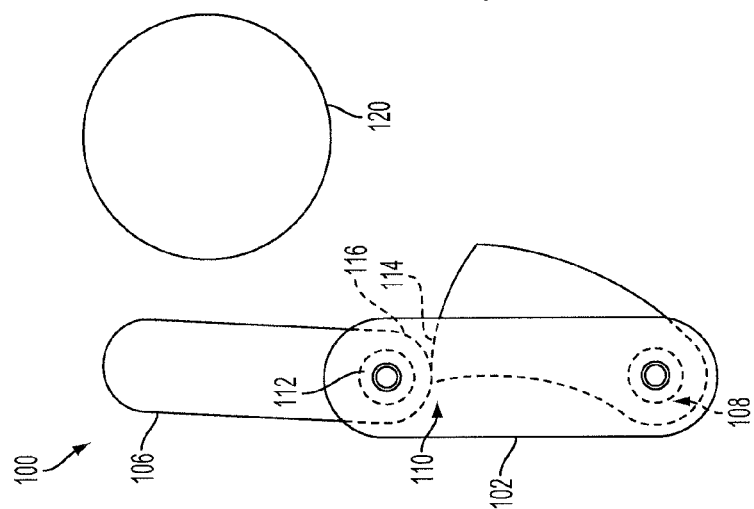

INTERCONNECTED PHALANGES FOR ROBOTIC GRIPPING

BACKGROUND

1. Field

The present invention relates to robotic gripping devices and methods of controlling and operating the robotic gripping devices.

2. Description of the Related Art

Robotic gripping devices have been used in various applications to interact with the surrounding environment and objects therein. Multi-bar linkages have been utilized in robotic fingers for gripping or pinching an object. However, the multi-bar linkages known in the art require a high number of components in addition to a high number of actuation points. Furthermore, ratio of phalange interaction and movement in such multi-bar linkages cannot be easily configured. Multi-bar linkage mechanisms known in the art also fail to provide stiffness or rigidity in certain directions, for example, for pushing or pressing interactions using a distal phalange.

Thus, there is a need for a simplified solution for robotic gripping with reduced number of components and actuation points. Furthermore, there is a need for robotic gripping that allows easy configuration of ratio of phalange interaction. In addition, there is a need in the art for robotic gripping that allows rigidity in distal or tip phalanges for pinching and similar gripping that requires rigidity in certain directions.

SUMMARY

The present invention relates to a robotic gripping device that allows for pinch and power grasps using configurable connections between interconnected phalanges. The robotic gripping device includes a proximal phalange, a contact phalange, and a distal phalange that are interconnected. The contact phalange may have a gear connection with the distal phalange and can rotate independent of the proximal phalange. The contact phalange may pivot around the same point as the proximal phalange or can pivot from any other point along the proximal phalange. A gear interface located between the contact phalange and the distal phalange can have various ratios depending on the radius of interaction or a combination of gears. The distal phalange has a mechanical stop, which can be adjustable to limit the range of rotation motion backwards and forwards. The distal phalange and the contact phalange have returns such as springs to keep them in their extended positions. The distal phalange and the contact phalange may be passive devices and can be moved independent of the proximal phalange.

A robotic gripping apparatus may include a proximal phalange having a first end portion and a second end portion. A distal phalange has a first end portion and a second end portion. The first end portion of the distal phalange is connected to the second end portion of the proximal phalange via a proximal-distal pivot or rotation connection. A contact phalange has a first end portion and a second end portion. The first end portion of the contact phalange is connected to the first end portion of the proximal phalange via a proximal-contact pivot or rotation connection. The second end portion of the contact phalange is connected to the first end portion of the distal phalange via a contact-distal pivot or rotation connection. In response to the contact phalange contacting an object, the contact phalange is configured to rotate in a first direction via the proximal-contact pivot or rotation connection toward the proximal phalange. The rotation in the first direction causes rotation of the distal phalange in a second direction opposite to the first direction and toward the object such that the distal phalange contacts the object.

The contact-distal pivot or rotation connection may be a gear connection. The gear connection may include a plurality of intermediary gears connected to the second end portion of the contact phalange and the first end portion of the distal phalange. The second end portion of the contact phalange may have a gear surface in direct contact with a gear surface of the first end portion of the distal phalange. An electromechanical actuator may rotate the proximal phalange. The contact phalange does not rotate when there is no contact between the contact phalange and an object. A mechanical stop limits the range of backwards and forwards rotation motion of the distal phalange. The mechanical stop maintains the distal phalange in an extended position when the distal phalange, but not the contact phalange, contacts an object. The actuator may rotate the proximal phalange in a third direction such that the rotation of the contact phalange in the first direction, the rotation of the distal phalange in the second direction, and the rotation of the proximal phalange in the third direction are in equilibrium to allow the interconnected phalanges to grip the object.

A robotic gripping apparatus may include a first proximal phalange having a first end portion and a second end portion. A second proximal phalange has a first end portion and a second end portion. The first end portion of the second proximal phalange is connected to the second end portion of the first proximal phalange via a first proximal-distal pivot or rotation connection. A first contact phalange has a first end portion and a second portion. The first end portion of the first contact phalange is connected to the first proximal phalange via a first proximal-contact pivot or rotation connection. The second end portion of the first contact phalange is connected to the first end portion of the second proximal phalange via a first contact-distal pivot or rotation connection. In response to the first contact phalange contacting an object, the first contact phalange is configured to rotate in a first direction via the first proximal-contact pivot or rotation connection toward the first proximal phalange. The rotation in the first direction causes rotation of the second proximal phalange in a second direction opposite to the first direction and toward the object.

A distal phalange has a first end portion and a second end portion. The first end portion of the distal phalange is connected to the second end portion of the second proximal phalange via a second proximal-distal pivot or rotation connection. A second contact phalange has a first end portion and a second portion. The first end portion of the second contact phalange is connected to the first end portion of the second proximal phalange via a second proximal-contact pivot or rotation connection. The second end portion of the second contact phalange is connected to the first end portion of the distal phalange via a second contact-distal pivot or rotation connection. In response to the second contact phalange contacting the object, the second contact phalange is configured to rotate in a third direction via the second proximal-contact pivot or rotation connection toward the second proximal phalange. The rotation in the third direction causes rotation of the distal phalange in a fourth direction opposite to the third direction and toward the object.

A robotic gripping apparatus may include a proximal phalange having a first end portion and a second end portion. A distal phalange has a first end portion and a second end portion. The first end portion of the distal phalange is connected to the second end portion of the proximal phalange via a proximal-distal pivot or rotation connection. The first end portion of the distal phalange further has a gear surface with a first plurality of teeth. A contact phalange has a first end portion and a second end portion. The first end portion of the contact phalange is connected to the proximal phalange via a proximal-contact pivot or rotation connection. The second end portion of the contact phalange has a gear surface with a second plurality of teeth engaged with the first plurality of teeth of the gear surface of the distal phalange. In response to the contact phalange contacting an object, the contact phalange is configured to rotate in a first direction. The rotation in the first direction causes rotation of the distal phalange in a second direction opposite to the first direction and toward the object such that the distal phalange contacts the object.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 3A is a schematic side view of a plurality of interconnected phalanges with the distal phalange being in an extended position according to an embodiment of the present invention;

FIG. 3B is a schematic side view of the plurality of interconnected phalanges of FIG. 3A with the distal phalange being rotated down in response to the contact phalange being rotated inwards according to an embodiment of the present invention;

FIG. 3C is a schematic side view of a plurality of interconnected phalanges of FIG. 3B with the distal phalange being further rotated down in response to the contact phalange being further rotated inwards according to an embodiment of the present invention;

FIG. 4 is a schematic side view of a plurality of interconnected phalanges and an object in proximity of a distal phalange according to an embodiment of the present invention;

FIG. 5A is a schematic side view of a plurality of interconnected phalanges and an object in contact with a distal phalange according to an embodiment of the present invention;

FIG. 5B is a schematic side view of a plurality of interconnected phalanges and an object in contact with a distal phalange during a pressing operation according to an embodiment of the present invention;

DETAILED DESCRIPTION

Apparatus, systems and methods that implement the embodiments of the various features of the present application will now be described with reference to the drawings. The drawings and the associated descriptions are provided to illustrate some embodiments of the present application and not to limit the scope of the present application. Throughout the drawings, reference numbers are re-used to indicate correspondence between referenced elements.

The present invention relates to a robotic gripping device that allows for pinch and power grasps using configurable connections between interconnected phalanges. The robotic gripping device includes a proximal phalange, a contact phalange, and a distal phalange that are all interconnected. The contact phalange may have a gear connection with the distal phalange and can rotate independent of the proximal phalange. The contact phalange can pivot around the same point as the proximal phalange or can pivot from any other point along the proximal phalange. A gear interface located between the contact phalange and the distal phalange can have various ratios depending on the radius of interaction or a combination of gears.

The distal phalange may have a mechanical stop, which can be adjustable to limit the range of rotation motion, backwards and forwards. The mechanical stop allows the distal phalange to remain firm if the contact phalange is not rotated. The distal phalange and the contact phalange may have returns such as springs to keep them in their extended positions. The distal phalange and the contact phalange may be passive devices and can be moved independent of the proximal phalange.

A robot with a mechanical hand may implement a robotic gripper as described herein. As the proximal phalange rotates, if the contact phalange contacts an object, the contact phalange will rotate in and the distal phalange will rotate down. This allows a more secure grasp with an under actuated finger. The present invention advantageously reduces the number of moving parts in the mechanical linkage system. The present invention also advantageously creates an easily changeable ratio of movement between phalanges. The changeable ratio of movement advantageously allows for various forms of contact structures.

Figure 1A:
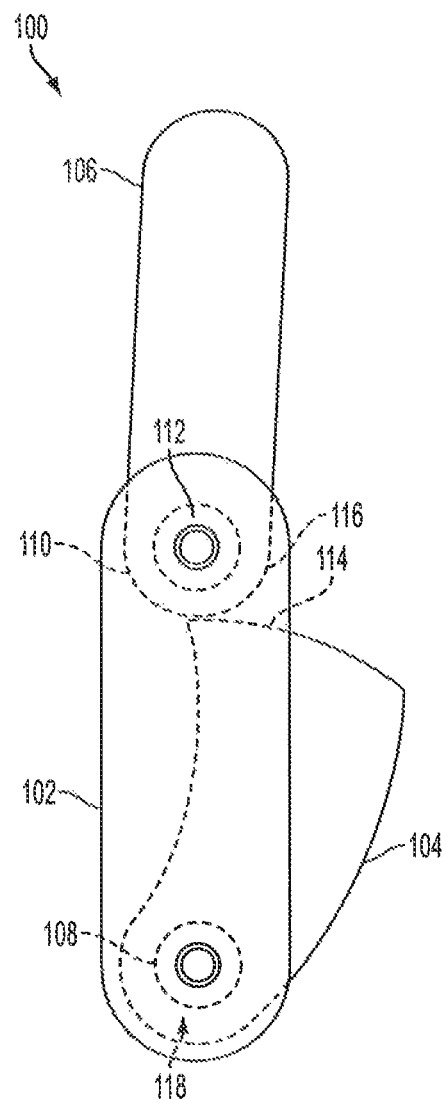
FIG. 1A is a schematic side view of a plurality of interconnected phalanges for robotic gripping according to an embodiment of the present invention.

Referring to FIG. 1A, a plurality of interconnected phalanges 100 for robotic gripping are shown. Hereinafter, dotted connections indicate components that are behind a surface, and more particularly, behind a proximal phalange 102 in FIG. 1A. The proximal phalange 102 is connected to a distal phalange 106. "Proximal" as used herein is a term defining relevant positioning of components. Proximal refers to an element that is closer to the actuation point (for example, at electromechanical actuator 118), as compared with another element such as the distal phalange 106. A second end portion of the proximal phalange 102 is connected to a first end portion of the distal phalange 106 via a proximal-distal connection 112. Hereinafter, a "connection" refers to a rotation or pivot connecting mechanism that allows rotation or pivoting of members that are connected together via the "connection." The "connection" may be a gear, cable or linkage interface, or other rotation or pivoting connection mechanisms.

One of the important features of the invention is a contact phalange 104 and its unique interaction with the distal phalange 106 and the proximal phalange 102. The contact phalange 104 has a first end portion connected to the proximal phalange 102 via a proximal-contact connection 108. The contact phalange 104 has a second end portion connected to a first end portion of the distal phalange 106 via a contact-distal connection 110.

The contact phalange's second end surface 114 of the contact phalange 104 may be rotatably connected to the distal phalange's first end surface 116 either directly or via intermediary rotation or pivot mechanisms. One of the advantageous features of the invention is the design flexibility provided by the contact-distal connection 110. The contact phalange's second end surface 114 and the distal phalange's first end surface 116 may each be gear surfaces, The gear interface allows control of ratio of movement and velocity between the distal phalange 106 and the contact phalange 104.

Alternatively, the contact-distal connection 110 may include a series of connecting gears (which includes intermediate gear connections) to easily allow ratio change between the movement of the contact phalange 104 and the distal phalange 106.

Figure 1B:
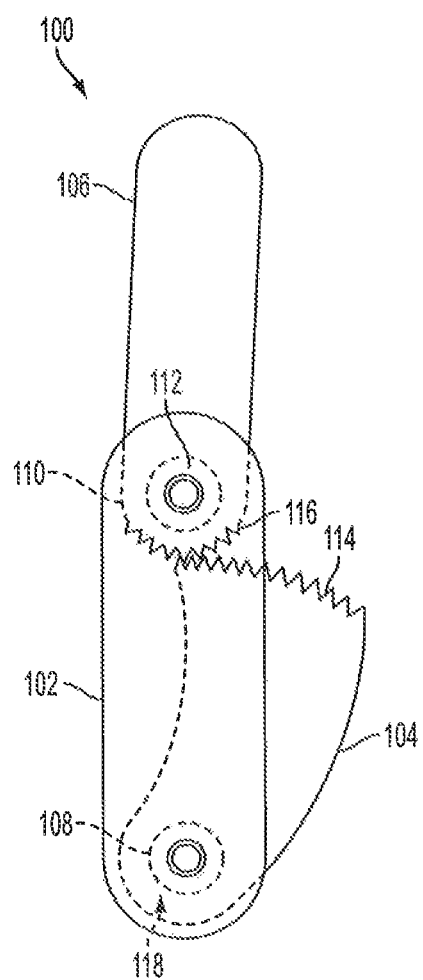
FIG. 1B is a schematic side view of a plurality of interconnected phalanges having a contact phalange in direct gear contact with a distal phalange according to an embodiment of the present invention.

FIG. 1B is a schematic side view of a plurality of interconnected phalanges having a contact phalange 104 with a second end in direct gear contact with a first end portion of a distal phalange 106. The contact phalange's second end surface 114 may be a gear surface with teeth. The first end surface 116 may also be a geared surface having teeth rotatably engaged with the teeth of the second end surface 114 of the contact phalange 104. In effect, the contact phalange 104 acts as a large gear, and the distal phalange 106 acts as a small gear in this embodiment. The foregoing feature advantageously allows control of ratio of behavior of the distal phalange 106 and the proximal phalange 102 by adjusting the size of the gears.

Figure 1C:
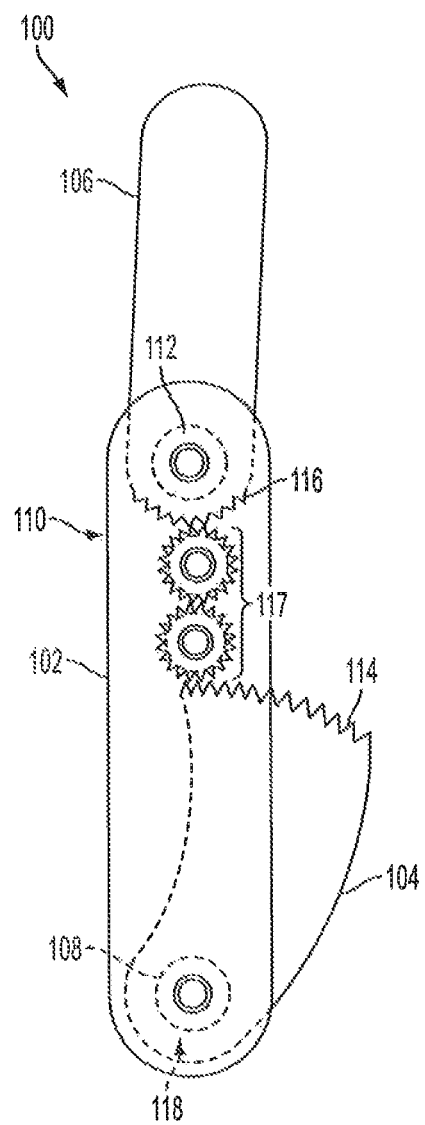
FIG. 1C is a schematic side view of a plurality of interconnected phalanges having a contact phalange in gear contact with a distal phalange via at least one intermediary gear according to an embodiment of the present invention.

FIG. 1C shows a contact phalange 104 in gear contact with a distal phalange 106 via at least one intermediary gear 117. Although two intermediary gears 117 are shown, it can be appreciated that one or more than two intermediary gears 117 may be provided based on design considerations such as the desired gear ratio. A plurality of ratios can be utilized depending on a radius of interaction or a combination of gears. The foregoing feature advantageously allows control of the magnitude and type of movement of the distal phalange 106 as a function of movement of the contact phalange 104 for various gripping or pinching applications.

A unique advantage of the foregoing feature is that the ratio of movement between the distal phalange 106 and the contact phalange 104 is an adjustable ratio. The ratio of movement of the distal phalange 106 and the contact phalange 104 can be adjusted without replacement of the distal phalange 106 and the contact phalange 104.

A gear shifting mechanism may be provided for dynamically adjusting the ratio of behavior of the distal phalange 106 and the contact phalange 104, based on the desired movement. This can provide greater accuracy and precision in dynamic control of gripping or pinching of an object.

Referring to FIGS. 1A-1C, an electromechanical actuator 118 may be provided for controlling rotation of a combination of the proximal phalange 102, the contact phalange 104, and the distal phalange 106, as a whole. When actuated, the combination of the proximal phalange 102, the contact phalange 104, and the distal phalange 106, as a whole, may rotate about a first end portion of the proximal phalange 102. The actuator 118 may cause rotation of the combination of the proximal phalange 102, the contact phalange 104, and the distal phalange 106, as a whole, via a gear, cable or linkage interface. An electronic controller or processor may be incorporated in a robotic device to control the actuator 118 that drives the rotation at the first end portion of the proximal phalange 102.

Figure 2:
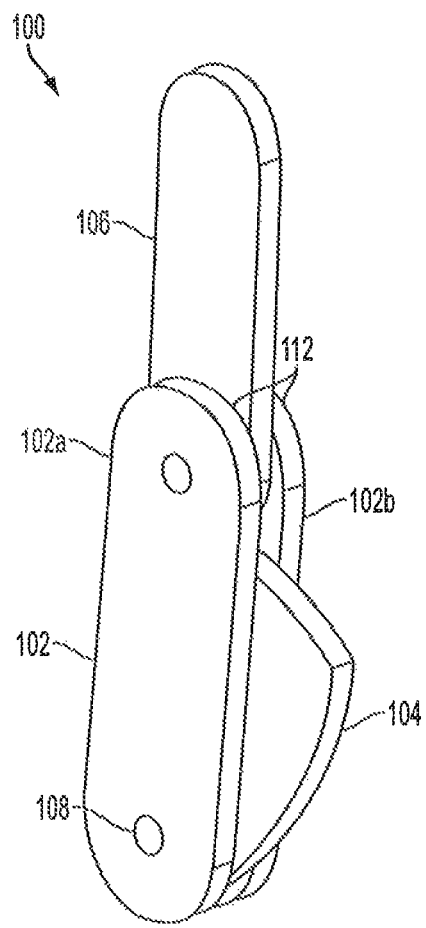
FIG. 2 is a schematic side view of a plurality of interconnected phalanges with the proximal phalange including two parallel plates according to an embodiment of the present invention.

FIG. 2 shows a plurality of interconnected phalanges with the proximal phalange 102 including a first plate 102a and a second plate 102b substantially parallel to the first plate 102a. Each of the plates 102a and 102b has a first end portion connected to the first end portion of the contact phalange 104 via the proximal-contact connection 108. Each of the plates 102a and 102b has a second end portion connected to the first end portion of the distal phalange 106 via the proximal-distal connection 112. Alternatively, the plates 102a and 102b can be molded together to form a single-piece proximal phalange.

FIGS. 3A-3C are schematic snapshot side views of rotation motions of a distal phalange 106 in response to rotation of a contact phalange 104. FIG. 3A is a schematic side view of the distal phalange 106 being in an extended position, when there is no contact between an object and the contact phalange 104. FIG. 3B shows the distal phalange 106 being partially rotated down in response to the contact phalange 104 being rotated inwards. FIG. 3C shows the distal phalange 106 being further rotated down in response to the contact phalange 104 being further rotated inwards.

FIG. 4 shows a plurality of interconnected phalanges 100 and an object 120 in proximity of the distal phalange 106. Different types of gripping and grasps can be controlled using the interconnected phalanges 100 of the present invention. A type of gripping illustrated here is a pinch grasp, for example, when picking up a piece of paper using tips of two fingers. FIG. 4 shows the distal phalange 106 in an extended position before the object 120 contacts the contact phalange 104.

FIG. 5A shows the object 120 in contact with the distal phalange 106. The actuator 118 may drive and rotate the interconnected phalanges 100 (including the proximal phalange 102, the contact phalange 104 and the distal phalange 106) as a whole in the direction 122. Alternatively, the proximal phalange 102 can be moved laterally, instead of or in addition to the rotation, to cause contact between the distal phalange 106 and the object 120. As the actuator 118 causes rotation of the interconnected phalanges 100 as a whole, the distal phalange 106 remains in the extended position if the contact phalange 104 does not contact anything. Furthermore, the contact phalange 104 remains in static position without rotation with respect to the distal phalange 106 or the proximal phalange 102.

Extended position as used herein refers to positioning of the distal phalange 106. In the extended state, the distal phalange 106 is not rotated inwards yet with respect to the proximal phalange 102. The distal phalange 106 may have a mechanical stop 119, which can be adjustable to limit the range of rotation motion backwards and forwards. The mechanical stop 119 can be adjusted to set an angle between the distal phalange 106 and the proximal phalange 102 when there is no contact between the contact phalange 104 and an object. The angle between the distal phalange 106 and the proximal phalange 102 may be roughly 180 degrees, but the phalanges can be modified to be positioned at a different angle in the extended state. For example, the angle in the static position may be adjusted to be 160 degrees, 170 degrees, 190 degrees, or 200 degrees.

FIG. 5B shows the distal phalange 106 pressing an object 120. When the distal phalange 106 comes into contact with an object 120, a mechanical stop 119 of the distal phalange 106 prevents the distal phalange 106 from rotating backward beyond a limit or threshold. The mechanical stop 119 allows the distal phalange 106 to remain extended, unlike multi-bar linkages known in the art which fail to provide rigidity during such pushing processes. The interconnected phalanges 100 would remain intact.

The distal phalange 106 remains extended and applies a pressing force to the object 120. For example, if the interconnected phalanges 100 are used to open a microwave by pressing a small push button (which may be object 120) to release the microwave door, the distal phalange 106 can apply the pressure and remain extended. The multi-link embodiments known in the art fail to provide such rigidity or firmness when applying pressure to a microwave release button or during pushing processes of the like.

The distal phalange 106 may also have a return mechanism. The return mechanism may include a spring. The spring exerts a force in a direction opposite to inward rotation of the distal phalange 106 in order to return the distal phalange 106 to the extended position once there is no contact between the contact phalange 104 and an object.

Figure 6:
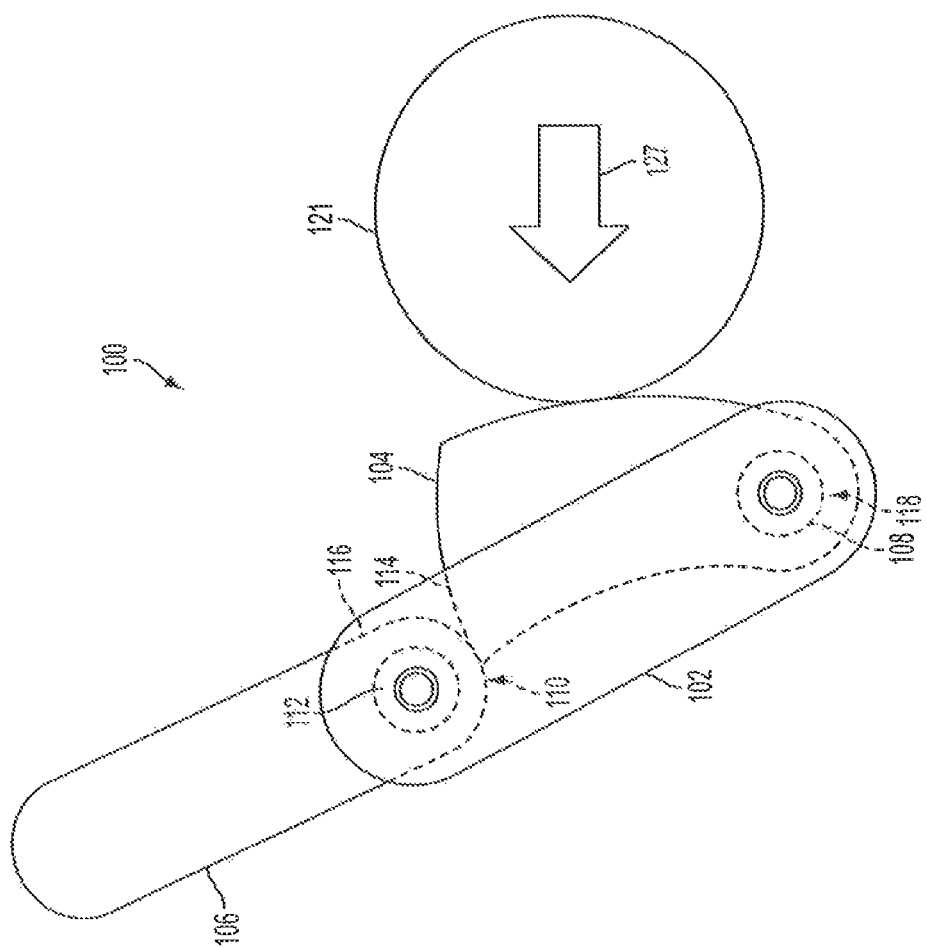
FIG. 6 is a schematic side view of a plurality of interconnected phalanges when an object and a contact phalange push against one another according to an embodiment of the present invention.

FIG. 6 shows a plurality of interconnected phalanges 100 when an object 121 moves in a left direction as shown in the arrow within the object 121. The object 121 pushes against the contact phalange 104. Alternatively or in addition, the interconnected phalanges 100 may be moved towards the object 121 via an actuation mechanism (e.g., actuator 118), thereby exerting a force on the object 121 at the contact phalange 104. When there is sufficient force on the contact phalange 104, the contact phalange 104 would rotate inward as discussed below with respect to FIG. 7. The threshold of force that would be sufficient to rotate the contact phalange 104 inward can be adjusted. For example, the contact phalange 104 may have a spring mechanism pushing forward opposite the direction 127.

Figure 7:
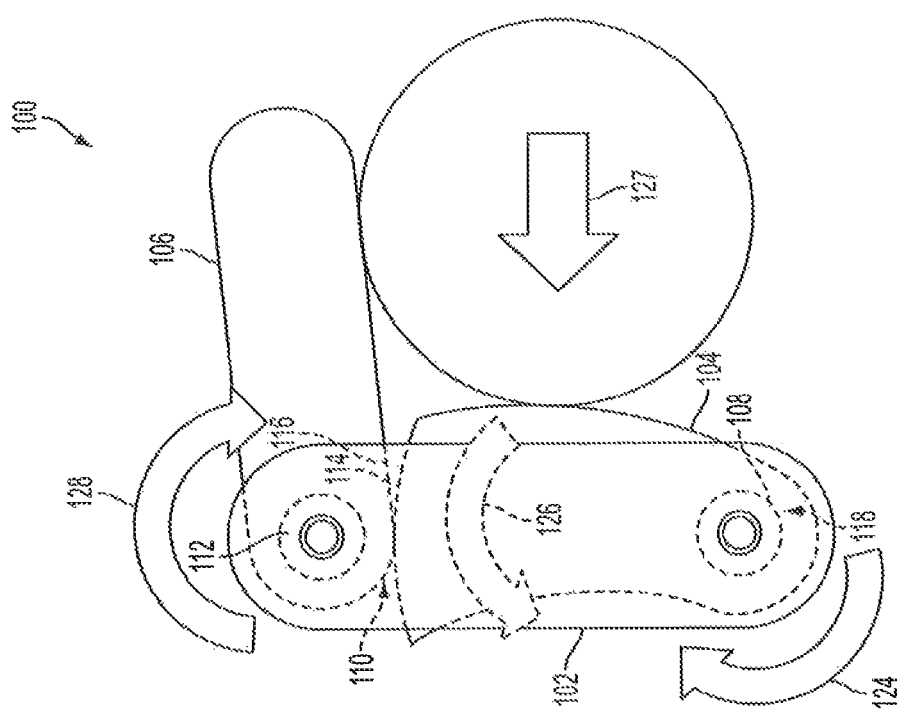
FIG. 7 is a schematic side view of a plurality of interconnected phalanges and a distal phalange rotating in downwards in response to a contact phalange rotating inwards according to an embodiment of the present invention.

FIG. 7 shows the actuator 118 rotating the proximal phalange 102 in direction 124. The object 121 is moving leftwards toward the contact phalange 104. The spring return mechanism of the contact phalange 104 pushes the contact phalange 104 in a direction opposing the movement direction 127 of the object 121. In this case, the force applied by the spring mechanism (in conjunction with the right-ward force component of actuation) is smaller than the force applied by the object 121 in the movement direction 127. Because the net sum of the competing forces applied by the object 121 and applied by the contact phalange 104 results in a leftward force substantially in the same direction as movement direction 127, the contact phalange 104 rotates inward in a first direction 126. The force applied by the contact phalange 104 can be modified to reach desirable interaction and gripping operation.

The inward rotation of the contact phalange 104 causes rotation of the distal phalange 106 in the second direction 128 (which is opposite the first direction 126). Once both the distal phalange 106 and the contact phalange 104 have made contact with the object 121, the mechanism establishes an internal balance of torques between distal phalange 106 and the contact phalange 104 and their respective contact position with the object 121. The interconnected phalanges 100 would reach an equilibrium and then maintain that position. The maintenance of equilibrium also depends on the driving actuator force in direction 124, which is applied by the actuator 118. As a result, the torques in directions 124, 126, and 128 would reach an equilibrium thereby allowing grasping of the object 121.

Figure 8:
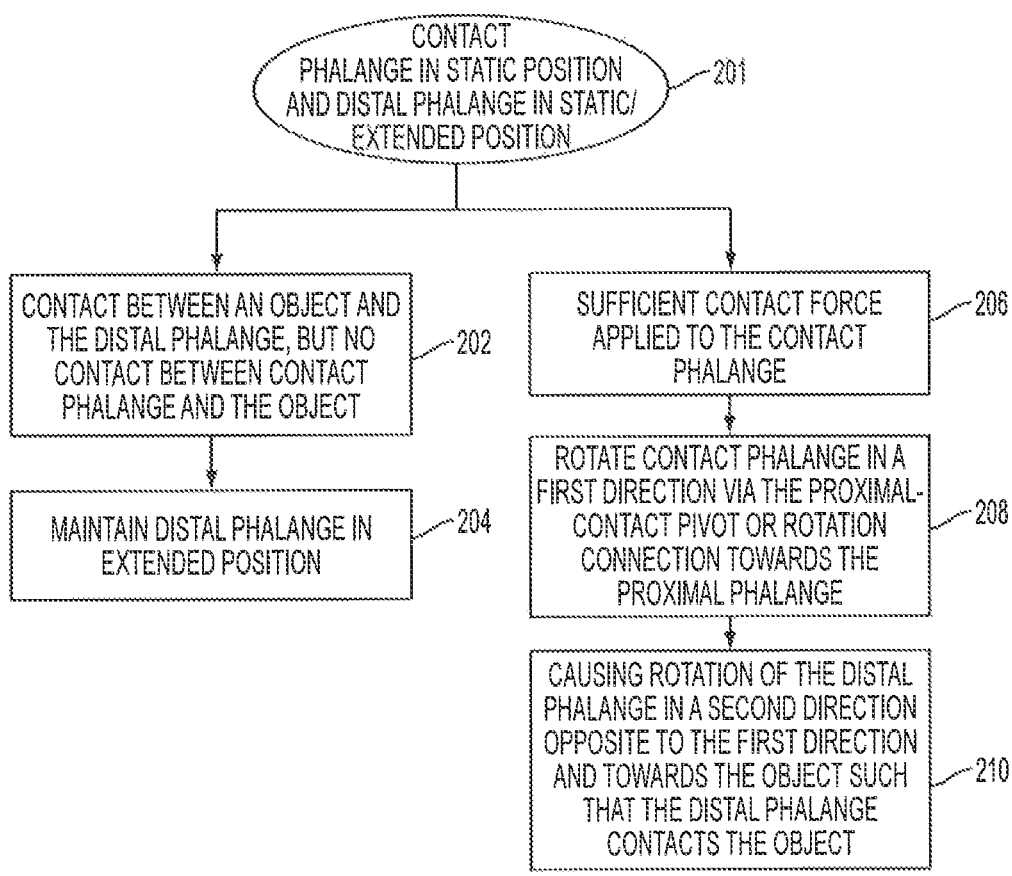
FIG. 8 is a flowchart diagram showing operations of the distal phalange and the contact phalange according to an embodiment of the present invention.

FIG. 8 is a flowchart diagram showing operations of the distal phalange 106 and the contact phalange 104. In block 201, the contact phalange 104 is in static position because either there is no contact with an object or there is no sufficient contact force with an object that that would overcome the spring force of the contact phalange 104. As a result, the contact phalange 104 has not rotated inwards and is in the static position. "Sufficient contact" as used herein refers to a contact force applied against the contact phalange 104, for example, by an object, such that the force is sufficient to overcome a threshold force, which depends on competing force applied in the opposite direction by the contact phalange 104. When the force applied against the contact phalange 104 is sufficient to overcome the static competing force, the contact phalange 104 rotates inwardly. "Sufficient contact" or "sufficient contact force" may refer to a contact force that is sufficient to overcome a spring force applied by the contact phalange 104 to resist inward rotation. The resistance force of the contact phalange 104 can be adjusted to achieve desirable control of the contact phalange 104, which in turn controls behavior of the distal phalange 106.

In block 202, an object 120 contacts the distal phalange 106, but there is no sufficient contact beyond a resistance force threshold between the contact phalange 104 and the object. As a result, as shown in block 204, the distal phalange 106 is maintained in an extended position, for example, using a mechanical stop 119 such as a spring mechanism. A mechanical break away (for example, with a ball detent structure) can be utilized for the distal phalange 106 such that if a sufficient amount of force is applied to the distal phalange 106, the distal phalange 106 would rotate initially. The distal phalange 106 would then spring back to its original position and be recaptured into its desired static extended position.

In block 206, there is sufficient contact force applied to the contact phalange 104, which is beyond a threshold force. The force may be applied by an object (for example, object 120 or 121 discussed above). As a result, the contact phalange 104 rotates inwards in a first direction via the proximal-contact connection 108 and toward the proximal phalange 102, as shown in block 208. The rotation of the contact phalange 104 causes rotation of the distal phalange 106 in a second direction opposite to the first direction and toward the object such that the distal phalange 106 contacts the object, as shown in block 210.

Position sensing, current sensing, or torque sensing may be utilized on the contact phalange 104 in order to allow detection of rotation of the contact phalange 104. This would also allow the controller and/or the processor of the robotic system to determine rotation of the distal phalange 106. Similar position sensing, current sensing, or torque sensing may be utilized on the distal phalange 106. A controller or a processor may control the actuator 118 based on the sensed data regarding contact of the contact phalange 104 with an object and/or rotations of the contact phalange 104, the proximal phalange 102, and/or the distal phalange 106.

Figure 9:
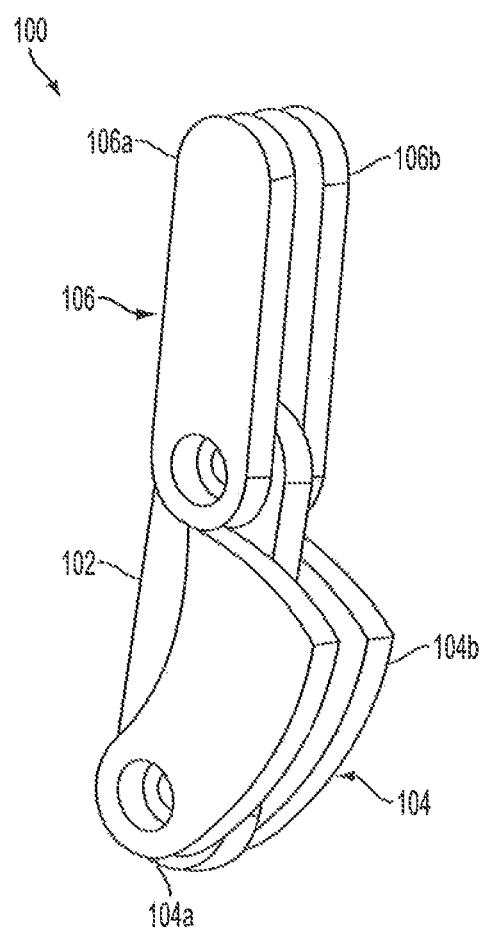
FIG. 9 is a schematic perspective view of a plurality of interconnected phalanges, the distal phalange and the contact phalange having two parallel plates according to an embodiment of the present invention.

FIG. 9 shows that the distal phalange 106 may have two parallel plates 106a and 106b, and the contact phalange 104 may have two parallel plates 104a and 104b. As a result, the contact phalange 104 is positioned externally (compare with the internal positioning shown in FIG. 2). The proximal phalange 102 is positioned internally. The two parallel plates 104a and 104b may be molded together such that outside movement is not impeded. Similarly, the parallel plates 106a and 106b may be molded together. One advantage of the embodiment in FIG. 9 is that the contact-distal connection 110 is externally positioned and easily accessible for modification. Another advantage of the embodiment in FIG. 9 is that the contact surface of the contact phalange 104 for pushing against an object is increased. A single actuator 118 may be utilized for actuating both parallel plates 104a and 104b. Alternatively, more than one actuator may be utilized such that each is actuated separately.

The mechanism of interconnected phalanges 100 can be extended ad infinitum, meaning one can be extended from another and so on. Unlike multi-linkage embodiments known in the art that are limited to the behavior thereof, further phalanges can be added to the interconnected phalanges of the present invention. The addition would advantageously maintain the behavior of the overall mechanism. One advantage of extending the same behavior using multiple links according to the present invention is that the controller can achieve a desirable multi-contact control of the phalanges with as little as a single actuation at the most proximal phalange, as discussed in further details below.

Figure 10:
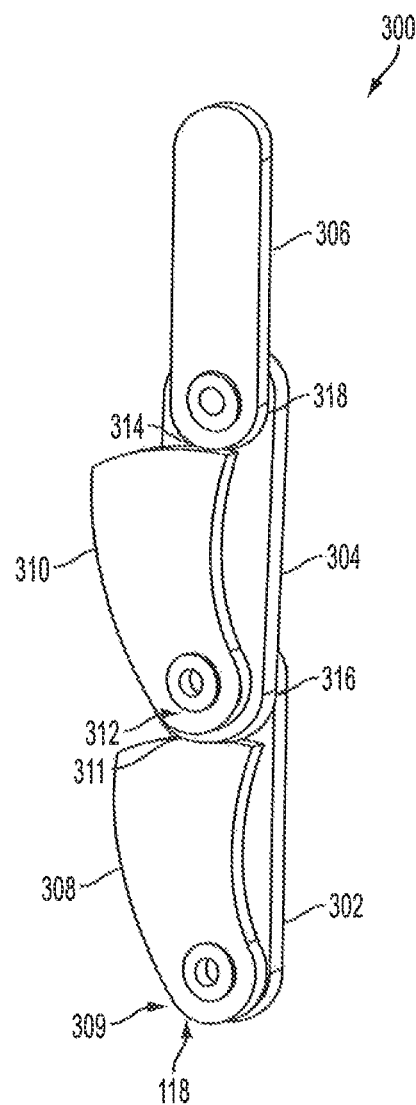
FIG. 10 is a schematic side view of five interconnected phalanges according to an embodiment of the present invention.

FIG. 10 is a schematic side view of five interconnected phalanges 300. Two extension phalanges are added to the embodiments discussed above with respect to FIGS. 1-9. The interconnected phalanges include a first proximal phalange 302 having a first end portion and a second end portion. A second proximal phalange 304 has a first end portion and a second end portion. The first end portion of the second proximal phalange 304 is connected to the second end portion of the first proximal phalange 302 via a first proximal-distal connection 316.

The first end portion of the first contact phalange 308 is connected to the first proximal phalange 302 via a first proximal-contact connection 309. The second end portion of the first contact phalange 308 is connected to the first end portion of the second proximal phalange 304 via a first contact-distal connection 311. In response to the first contact phalange 308 contacting an object, the first contact phalange 308 is configured to rotate in a first direction via the first proximal-contact connection 309 toward the first proximal phalange 302. This causes rotation of the second proximal phalange 304 in a second direction opposite to the first direction and toward the object.

A distal phalange 306 has a first end portion connected to the second end portion of the second proximal phalange 304 via a second proximal-distal connection 318. A second contact phalange 310 has a first end portion connected to the first end portion of the second proximal phalange 304 via a second proximal-contact connection 312. The second end portion of the second contact phalange 310 is connected to the first end portion of the distal phalange 306 via a second contact-distal connection 314. In response to the second contact phalange 310 contacting the object, the second contact phalange 310 is configured to rotate in a third direction via the second proximal-contact connection 312 toward the second proximal phalange 304. The rotation in the third direction causes rotation of the distal phalange 306 in a fourth direction opposite to the third direction and toward the object.

The first proximal phalange 302, the first contact phalange 308, and the second proximal phalange 304 operate similarly to the proximal phalange 102, the contact phalange 104, and the distal phalange 106, respectively, as set forth above with respect to FIGS. 1-9. The second contact phalange 310 is another contact phalange similar to the contact phalange 104, or the first contact phalange 308. If there is sufficient contact force applied to the second contact phalange 310, it rotates inward, thereby causing rotation of the distal phalange 306. The actuator 118 may drive and cause rotation of the first proximal phalange 302. The term "first proximal" indicates that the element is further proximal (or closer) to the actuation point of the actuator 118 than a "second proximal" element. The term "second proximal" indicates that the element is further proximal (or closer) to the actuation point of the actuator 118 than a "distal" element.

Figure 11:
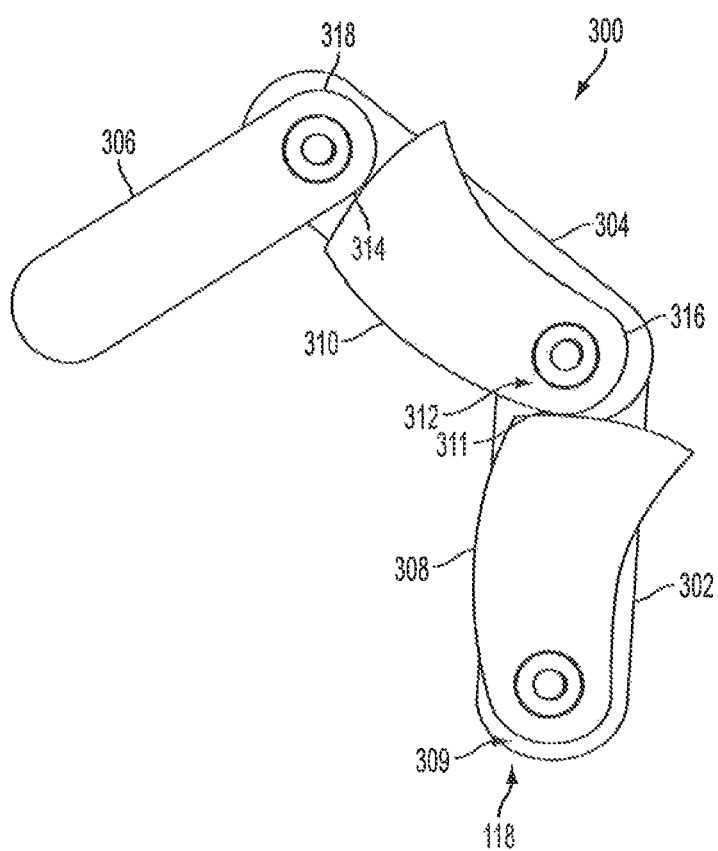
FIG. 11 is a schematic side view of five interconnected phalanges with certain phalanges being rotated inwards according to an embodiment of the present invention.

FIG. 11 is a schematic side view of five interconnected phalanges, with certain phalanges being rotated inwards. In this scenario, there has been sufficient contact with the first contact phalange 308, thereby causing rotation of the second proximal phalange 304. In addition, there has been sufficient contact with the second contact phalange 310, thereby causing rotation of the distal phalange 306. As a result, the interconnected phalanges wrap around an object for a power grasp, for example, when it is desirable to wrap phalanges around and grab a water bottle.

Figure 12:
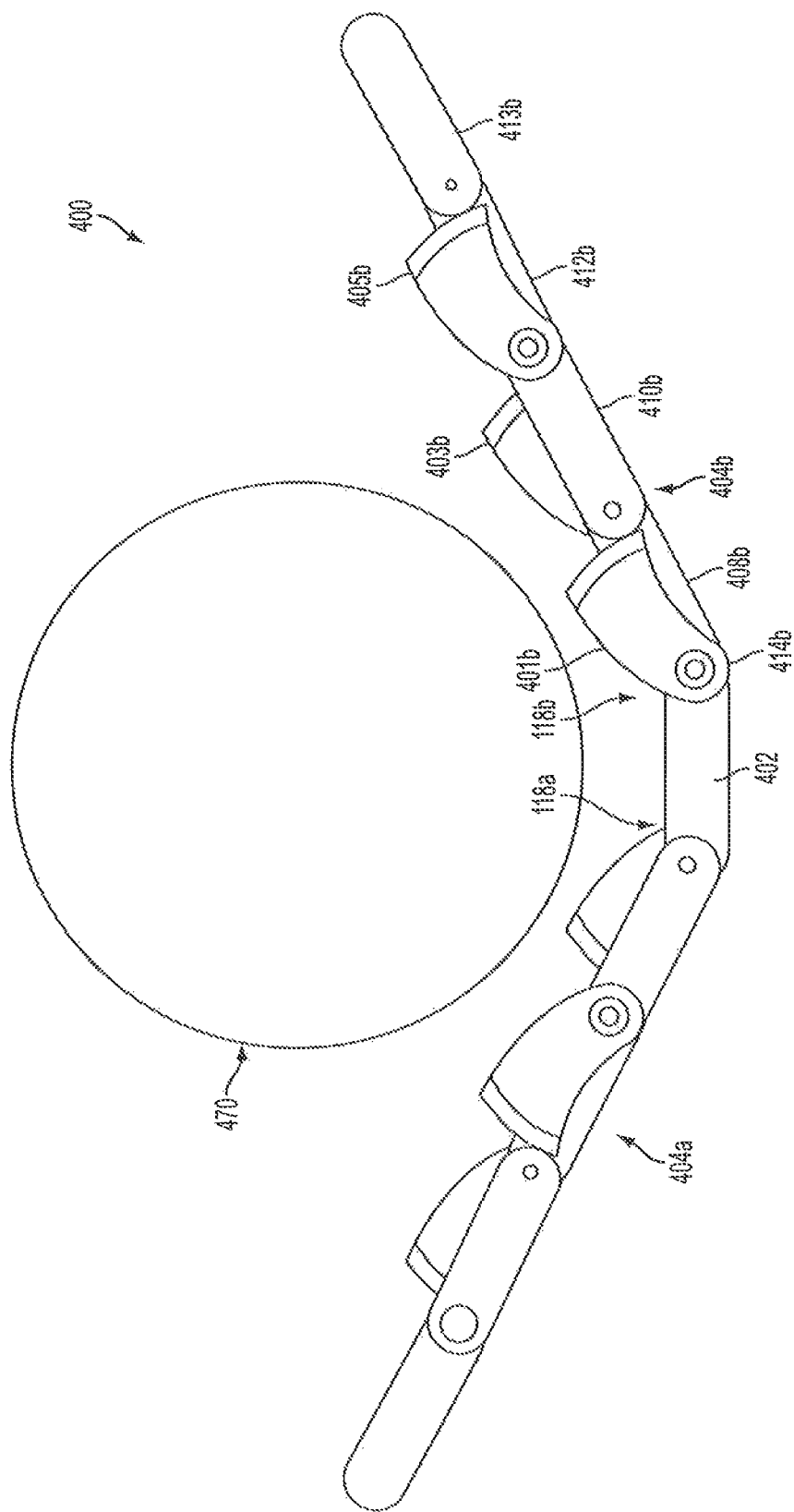
FIG. 12 is a schematic side view of a plurality of interconnected phalanges connected to a fixed base for gripping an object according to an embodiment of the present invention.

FIG. 12 is a schematic side view of a plurality of interconnected phalanges 400 connected to a fixed base 402 for gripping an object 470. A left multi-link finger 404a is utilized which is connected to the fixed base 402. A right multi-link finger 404b is also utilized which is connected to the fixed base 402 and positioned opposite the left multi-link finger 404a. A right actuator 118b may be utilized for controlling rotation of the right multi-link finger 404b with respect to the fixed base 402. A left actuator 118a may be utilized for controlling rotation of the left multi-link finger 404a with respect to the fixed base 402.

Although the elements of the right multi-link finger 404b is described below, it can be appreciated that similar elements on the left multi-link finger 404a may interact similarly.

The fixed base 402 is connected to the first right proximal phalange 408b via the fixed base-right first proximal connection 414b. The right actuator 118b may control pivoting of the first right proximal phalange 408b with respect to the fixed base 402. A first right contact phalange 401b, a first right proximal phalange 408b, a second right contact phalange 403b, a second right proximal phalange 410b, and a third right proximal phalange 412b on the right multi-link finger 404b are interconnected in the sane or similar manner as elements of FIGS. 10 and 11. The extended/added elements for the second multi-link finger are the distal phalange 413b, and the third right contact phalange 405b. The distal phalange 413b is configured to rotate inwards in response to a sufficient contact force applied to the third right contact phalange 405b such that the third right contact phalange 405b rotates inward.

Figure 13:
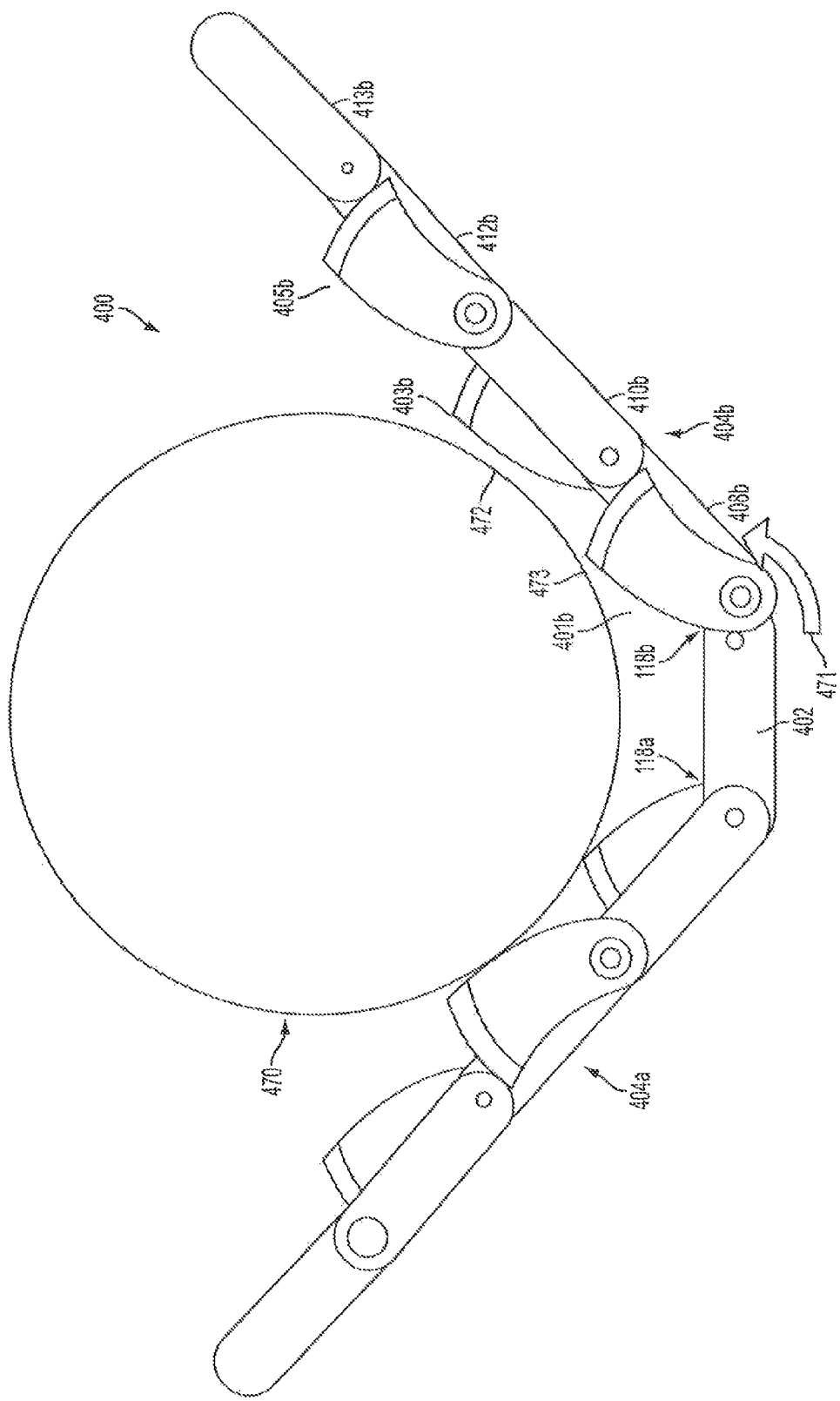
FIG. 13 is a schematic side view of a plurality of interconnected phalanges connected to a fixed base for gripping an object that is in contact with a contact phalange according to an embodiment of the present invention.

FIG. 13 shows the embodiment discussed above with respect to FIG. 12, when an object 470 comes into contact with the second right contact phalange 403b. The contact may be a result of rotation in direction 471 driven by the right actuator 118b. As a result, there is contact 472 between the second right contact phalange 403b and the object 470. There is also contact 473 between the first right contact phalange 401b and the object 470.

Figure 14:
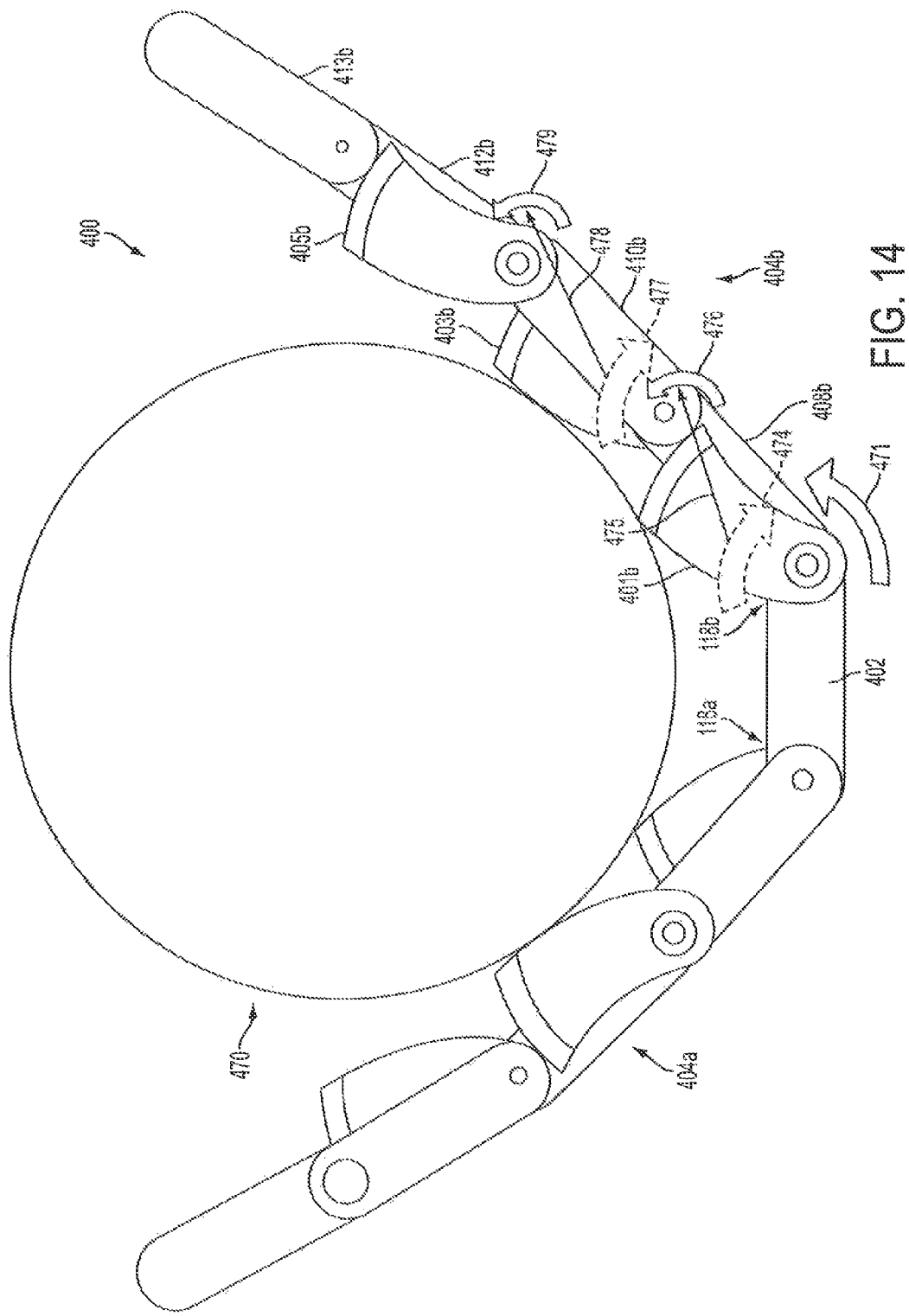
FIG. 14 is a schematic side view of a plurality of interconnected phalanges connected to a fixed base for gripping an object that is in contact with two contact phalanges according to an embodiment of the present invention.

FIG. 14 shows the reaction of the interconnected phalanges to the contact 472 and contact 473. As a result of the inward rotation in direction 474, the second right proximal phalange 410b is rotated inward in direction 476. Causation arrow 475 shows that rotation in direction 474 causes the rotation in direction 476. Similarly, as a result of rotation of second right contact phalange 403b in direction 477, the third right proximal phalange 412b rotates inward in direction 479. Causation arrow 478 shows that rotation in direction 477 causes the rotation in direction 479. The third right contact phalange 405b and the distal phalange 413b do not rotate because there is no contact with the third right contact phalange 405b at this juncture.

Figure 15:
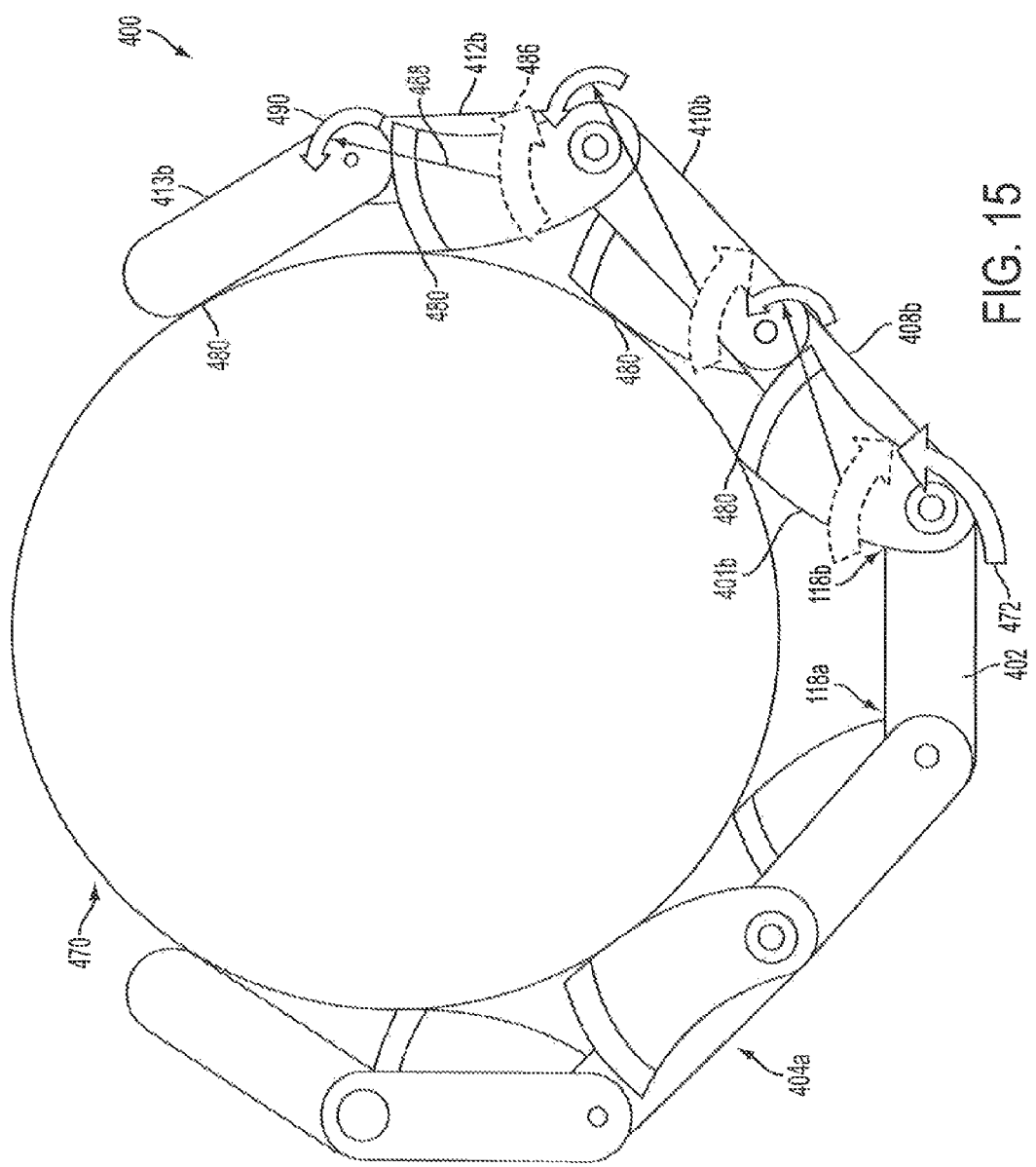
FIG. 15 is a schematic side view of a plurality of interconnected phalanges connected to a fixed base for gripping an object that is in contact with three contact phalanges according to an embodiment of the present invention.

FIG. 15 shows that as the right multi-link finger 404b closes, there is further contact between all contact phalanges 401b, 403b, and 405b, and the object 470 at the contact points 480. As a result, third right contact phalange 405b rotates inward in direction 486, thereby causing rotation of the distal phalange 413b in direction 490 (the relationship of rotation being shown by the causation arrow 488).

Figure 16:
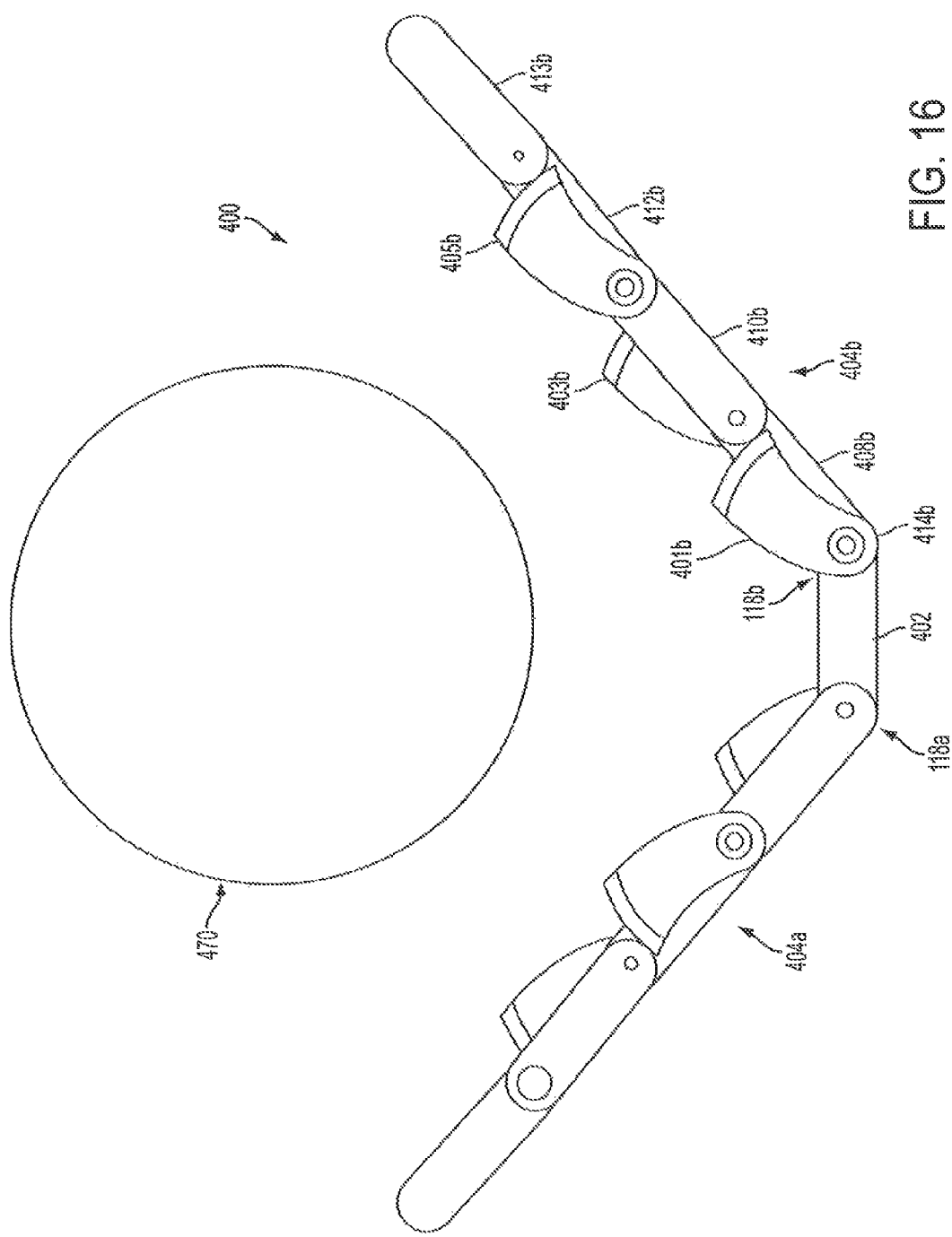
FIG. 16 is a schematic side view of a plurality of interconnected phalanges connected to a fixed base for gripping an object according to an embodiment of the present invention.
Figure 17:
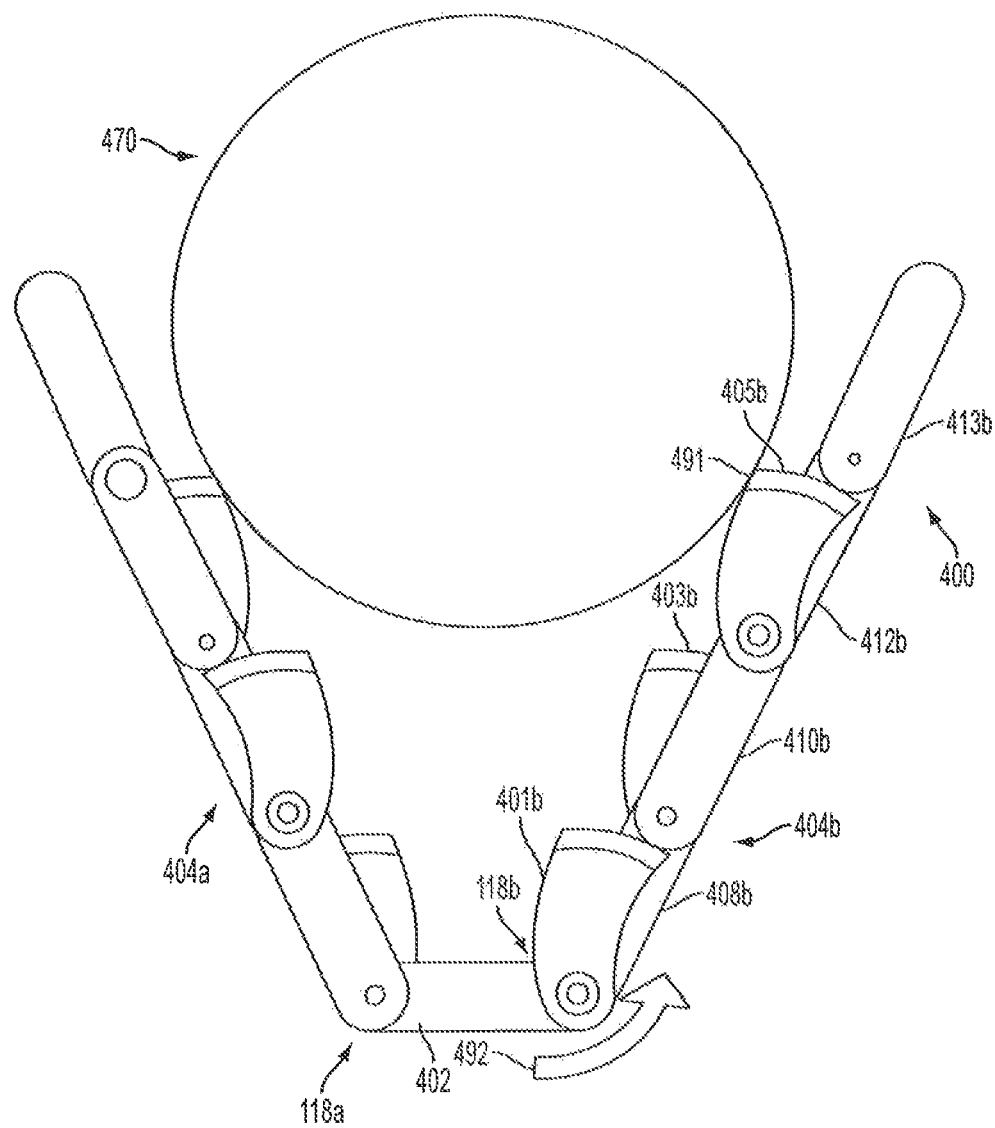
FIG. 17 is a schematic side view of a plurality of interconnected phalanges connected to a fixed base for gripping an object that comes to contact with a contact phalange according to an embodiment of the present invention.
Figure 18:
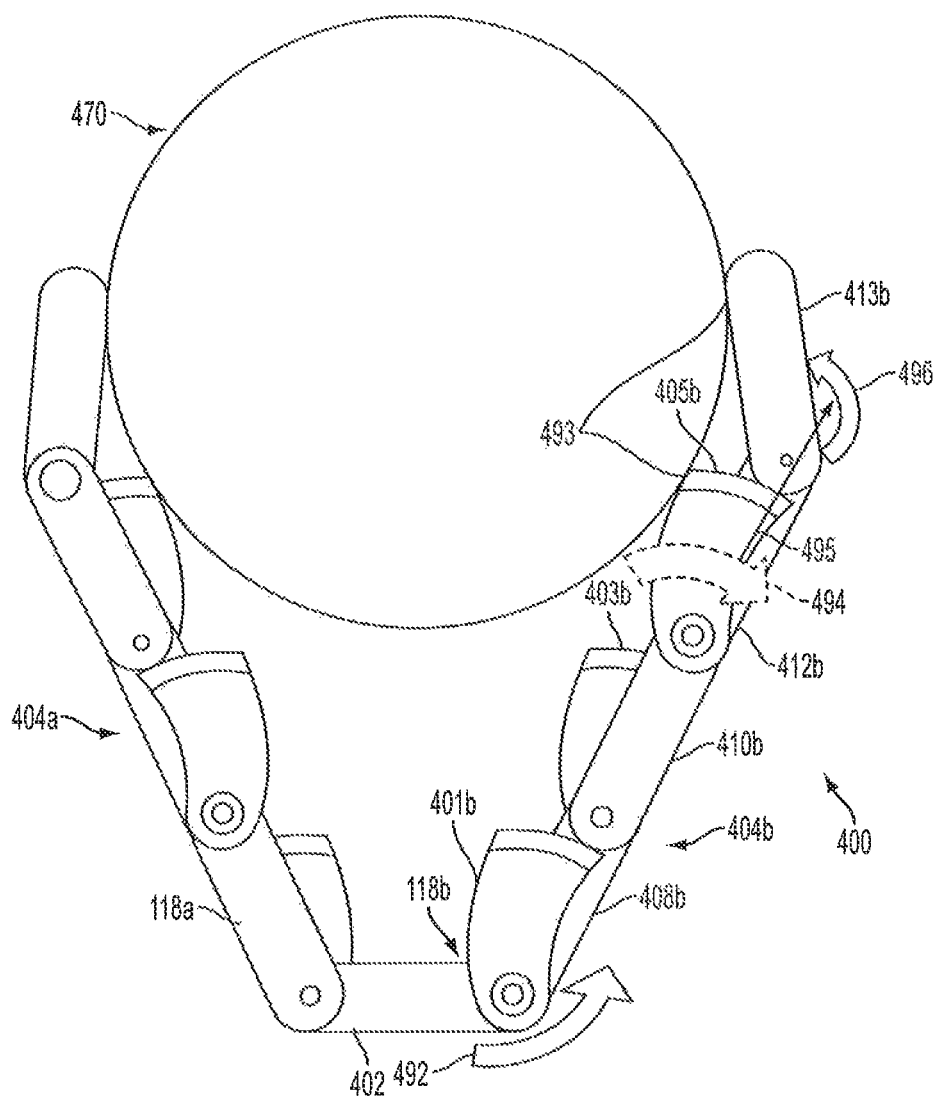
FIG. 18 is a schematic side view of a plurality of interconnected phalanges connected to a fixed base for gripping an object with a distal phalange rotating inwards in response to contact between an object and a corresponding contact phalange according to an embodiment of the present invention.

FIG. 16 is a schematic side view of a plurality of interconnected phalanges 400 connected to a fixed base 402 for gripping an object 470. FIG. 17 shows the right multi-link finger 404b being actuated in the direction 492 using the right actuator 118b, thereby causing the initial contact 491 between the object 470 and third right contact phalange 405b. FIG. 18 shows that as the right multi-link finger 404b is further rotated inward, there are two points of contact 493. As the third right contact phalange 405b rotates in direction 494, it causes the distal phalange 413b to rotate in direction 496 (as shown by causation arrow 495). Once the distal phalange 413b contacts the object 470, the forces in directions 492, 494, and 496 are balanced, thereby allowing the interconnected phalanges to effectively grip the object 470.

Figure 19:
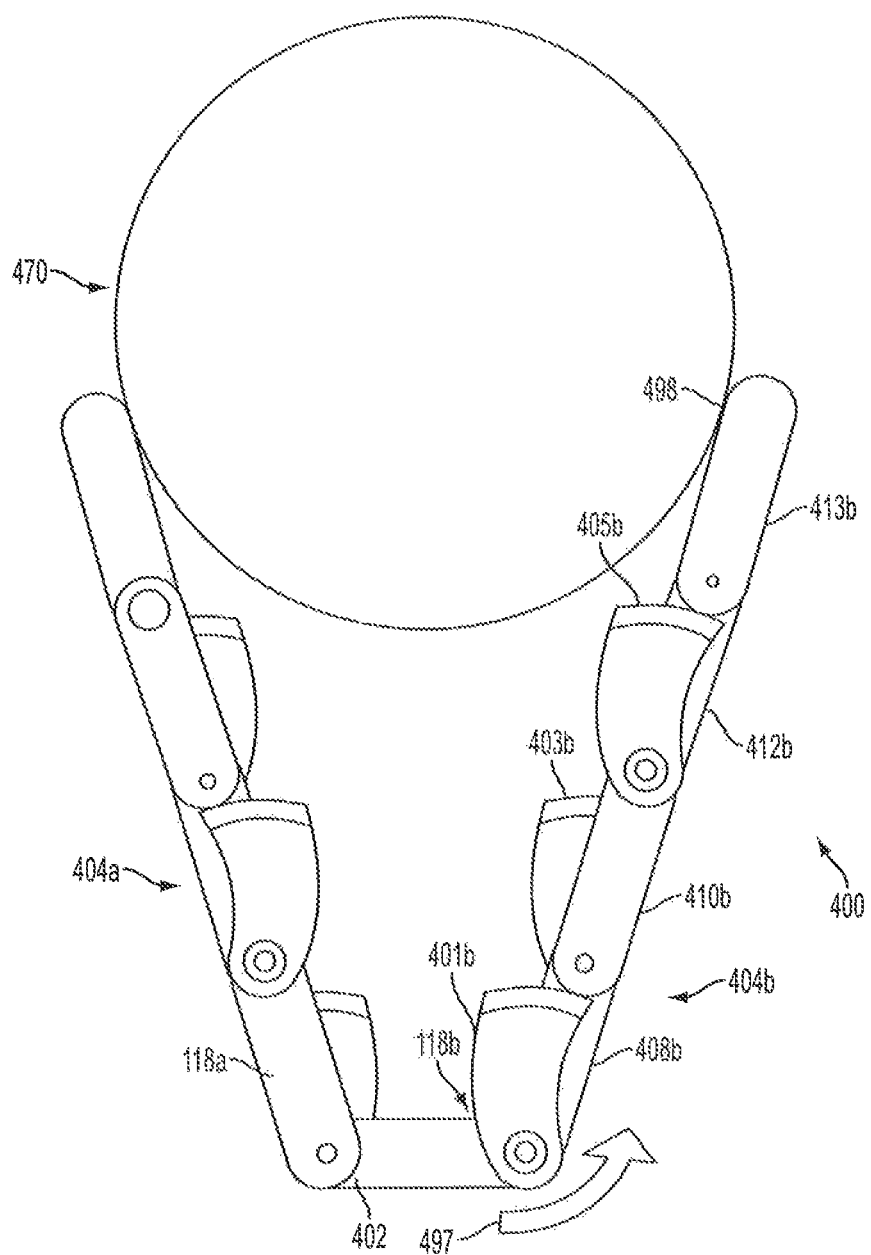
FIG. 19 is a schematic side view of a plurality of interconnected phalanges connected to a fixed base for gripping an object with a distal or tip phalange remaining extended in response to contact between an object and the distal or tip phalange according to an embodiment of the present invention.

FIG. 19 shows the distal phalange 413b contacting the object 470 at a single point of contact 498. Because none of the contact phalanges are in contact with the object 470, the distal phalange 413b remains in an extended position as the right multi-link finger 404b rotates inwards toward the object 470 in direction 497. The mechanical stop advantageously maintains the distal phalange 413b in an extended position. Therefore, advantageous rigidity is achieved in tip/distal contact points.

Figure 20A:
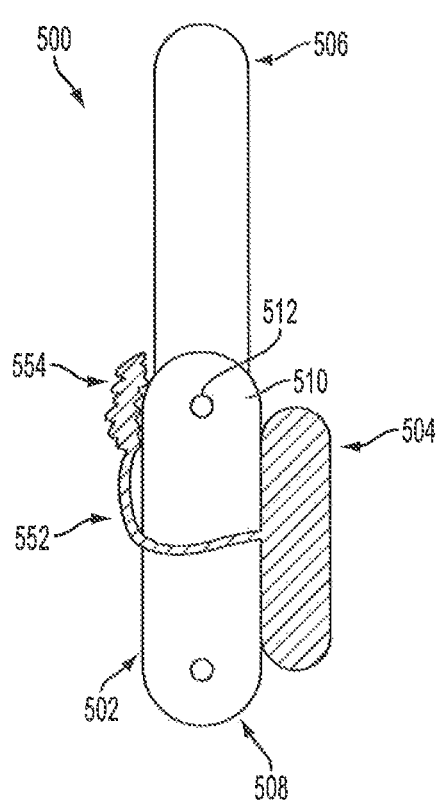
FIGS. 20A and 20B are schematic side views of a plurality of interconnected phalanges having a fluid transfer mechanism for controlling rotation of a distal phalange according to an embodiment of the present invention.
Figure 20B:
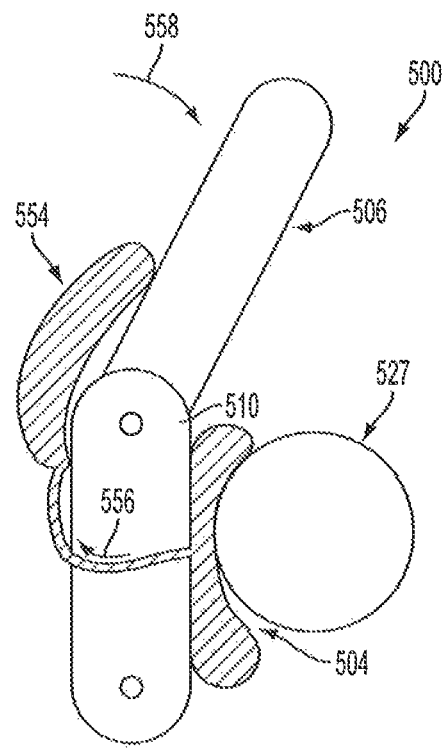

FIGS. 20A and 20B show a fluid transfer mechanism for controlling rotation of interconnected phalanges 500 upon contacting an object.

Referring to FIG. 20A, a proximal phalange 502 is connected to a distal phalange 506 via a proximal-distal connection 512 similar to the proximal phalange 102, the distal phalange 106, and the proximal-distal connection 112 discussed above with respect to FIG. 1A. The proximal phalange 510 can be under-actuated at actuation point 508 as discussed above with respect to FIGS. 1-19. Instead of a contact phalange 104, a first inflatable bag 504 can be coupled to the proximal phalange 502. The first inflatable bag 504 may be a fluid bladder. As shown in FIG. 20A, the first inflatable bag 504 is in an inflated state prior to contact with an object. The first inflatable bag 504 has a fluid connection with a second inflatable bag 554 via a tube 552. The second inflatable bag 554 may be a fluid bladder. Prior to contact with an object, the second inflatable bag 554 is in a compressed state, as shown in FIG. 20A. This configuration allows the distal phalange 506 to remain extended prior to contact with an object.

FIG. 20B shows the state of the interconnected phalanges 500 upon contact with an object 527. Contact with the object 527 causes compression of the first inflatable bag 504. This causes fluid transfer in the 556 direction, which expands the second inflatable bag. Expansion of the second inflatable bag 554 exerts a force on the distal phalange, and as a result, the distal phalange 506 rotates inward in the direction 558.

Figure 21A:
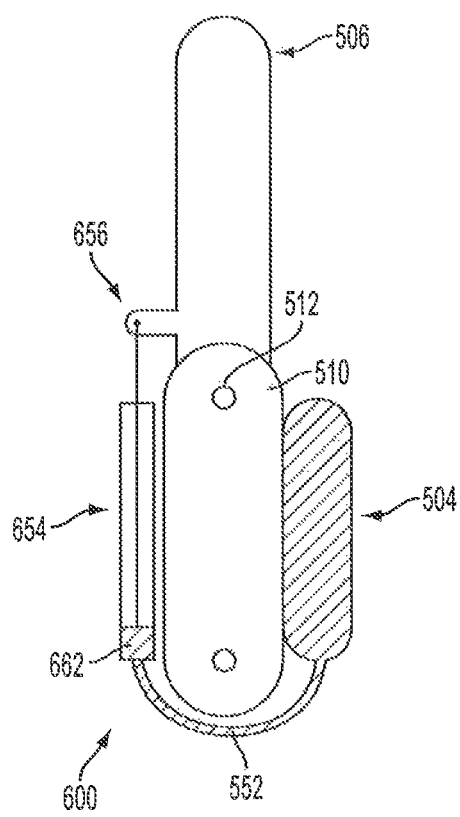
FIGS. 21A and 21B are schematic side views of a plurality of interconnected phalanges having a fluid transfer mechanism and a piston for controlling rotation of a distal phalange according to an embodiment of the present invention.
Figure 21B:
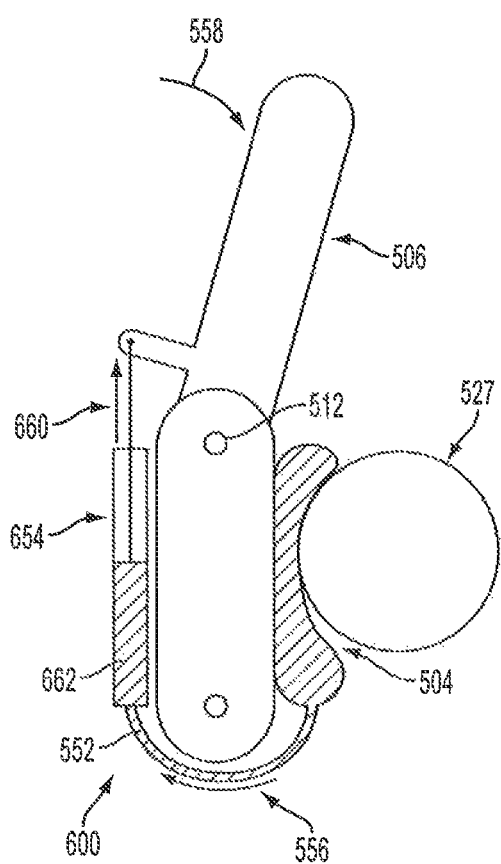

FIGS. 21A and 21B show yet another fluid transfer mechanism for controlling rotation of interconnected phalanges 600 upon contacting an object. Elements 504, 506, 510, 512, 552 operate similarly to the embodiment discussed above with respect to FIGS. 20A and 20B. Instead of a second inflatable bag 554, a piston 654 is utilized. The piston 654 is mechanically connected to the distal phalange 506 via a connection link 656. The piston 654 is fluidly connected to the first inflatable bag 504 via the tube 552.

Referring to FIG. 21A, prior to contact with an object, the first inflatable bag 504 is expanded and filled with fluid. The fluid level 662 in piston 654 is low, thereby keeping the distal phalange 506 in an extended state.

Referring to FIG. 21B, upon contact with the object 527, fluid transfers in direction 556 from the first inflatable bag 504 to the piston 654. As a result, the fluid level 662 rises and exerts a force at the connection link 656 in direction 660, thereby causing inward rotation of the distal phalange 506 toward the object 527 (as shown by direction 558). When there is no longer contact with the object 527, the first inflatable bag 504 would return to an inflated state, thereby causing return of the distal phalange 506 to the extended position. A spring mechanism can be utilized to help return the first inflatable bag 504 to an inflated state when the contact with the object 527 reduces or ceases, thereby causing the fluid level 662 to go back up.

A second inflatable bag 554 and a piston 654 were discussed above with respect to FIGS. 20A-21B as examples of a fluid mechanical unit. Upon receiving fluid from the compressed first inflatable bag 504, the fluid mechanical unit would exert a force on the distal phalange 506, thereby causing inward rotation.

It can be appreciated by a person of ordinary skill in the art that all phalanges described herein can be of other shapes, heights, widths and lengths as well as materials based on design concerns. The number of phalanges can be adjusted based on design concerns. Furthermore, skin or other coverings may be positioned on the phalanges to render them to be relatively soft.

References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The blocks of a method or algorithm described in connection with the examples disclosed herein may be embodied directly in hardware, in a software module executed by the processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium, such as a memory, is coupled to the processor such that the processor can read information from, and write information to, the storage medium. In the alternative, the storage medium may be integral to the processor. The processor and the storage medium may reside in an Application Specific Integrated Circuit (ASIC).

The methods/systems may be described herein in terms of functional block components, screen shots, optional selections and various processing blocks. It should be appreciated that such functional blocks may be realized by any number of hardware and/or software components configured to perform the specified functions. For example, the methods/systems may employ various integrated circuit components, e.g., memory elements, processing elements, logic elements, look-up tables, and the like, which may carry out a variety of functions under the control of one or more microprocessors or other control devices. Similarly, the software elements of the methods/systems may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and XML with the various algorithms being implemented with any combination of data structures, objects, processes, routines or other programming elements. Further, it should be noted that the methods/systems may employ any number of conventional techniques for data transmission, signaling, data processing, network control, and the like.

As will be appreciated by one of ordinary skill in the art, the methods/systems may be embodied as a customization of an existing system, an add-on product, upgraded software, a stand-alone system, a distributed system, a method, a data processing system, a device for data processing, and/or a computer program product. Furthermore, the methods/systems may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A robotic gripping apparatus, comprising:
   a proximal phalange having an elongated body with a first proximal phalange end portion and a second proximal phalange end portion;
   a distal phalange having an elongated body with a first distal phalange end portion connected to the second proximal phalange end portion via a proximal-distal pivot or rotation connection and a second distal phalange end portion;
   a contact phalange having an elongated body with a first contact phalange end portion connected to the first proximal phalange end portion via a proximal-contact pivot or rotation connection, and a second contact phalange end portion connected to the first distal phalange end portion via a contact-distal pivot or rotation connection; and
   in response to the contact phalange contacting an object, the contact phalange rotates in a first direction via the proximal-contact pivot or rotation connection toward the proximal phalange to cause rotation of the distal phalange in a second direction opposite to the first direction via the contact-distal pivot or rotation connection and toward the object such that the distal phalange contacts the object.

2. The robotic gripping apparatus of claim 1, wherein the contact-distal pivot or rotation connection is a gear connection.

3. The robotic gripping apparatus of claim 2, wherein the gear connection includes a plurality of intermediary gears connected to the second contact phalange end portion and the first distal phalange end portion.

4. The robotic gripping apparatus of claim 1, wherein the second contact phalange end portion has a gear surface in direct contact with a gear surface of the first distal phalange end portion.

5. The robotic gripping apparatus of claim 1, further comprising an electromechanical actuator configured to rotate the proximal phalange.

6. The robotic gripping apparatus of claim 1, wherein the proximal phalange includes a first plate and a second plate being substantially parallel to the first plate, each of the first plate and the second plate having a first end portion connected to the first contact phalange end portion via the proximal-contact pivot or rotation mechanism and a second end portion connected to the first distal phalange end portion of the distal phalange via the proximal-distal pivot or rotation connection, and
wherein the contact phalange is positioned parallel to and in between the first plate and the second plate of the proximal phalange.

7. The robotic gripping apparatus of claim 1, wherein the contact phalange includes a first plate and a second plate being substantially parallel to the first plate, each of the first plate and the second plate having a first end portion connected to the first proximal phalange end portion via the proximal-contact pivot or rotation mechanism and a second end portion connected to the first distal phalange end portion, and
wherein the proximal phalange is positioned parallel to and in between the first plate and the second plate of the contact phalange.

8. The robotic gripping apparatus of claim 1, wherein the contact phalange does not rotate when there is no contact between the contact phalange and the object.

9. The robotic gripping apparatus of claim 1, further comprising a mechanical stop configured to limit a range of backward and forward rotation motions of the distal phalange, and further configured to maintain the distal phalange in an extended position when the distal phalange, but not the contact phalange, contacts the object.

10. The robotic gripping apparatus of claim 1, further comprising an electromechanical actuator configured to rotate the proximal phalange in a third direction such that the rotation of the contact phalange in the first direction, the rotation of the distal phalange in the second direction, and the rotation of the proximal phalange in the third direction are controlled to be in equilibrium to allow the phalanges to grip the object.

11. A robotic gripping apparatus, comprising:
a first proximal phalange having a first end portion and a second end portion;
a second proximal phalange having a first end portion and a second end portion, the first end portion of the second proximal phalange being connected to the second end portion of the first proximal phalange via a first proximal-distal pivot or rotation connection;
a first contact phalange having a first end portion and a second end portion, the first end portion of the first contact phalange being connected to the first end portion of the first proximal phalange via a first proximal-contact pivot or rotation connection, and the second end portion of the first contact phalange being connected to the first end portion of the second proximal phalange via a first contact-distal pivot or rotation connection that is configured to control a ratio of movement and velocity between the first contact phalange and the second proximal phalange, and
in response to the first contact phalange contacting an object, the first contact phalange is configured to rotate in a first direction via the first proximal-contact pivot or rotation connection toward the first proximal phalange to cause rotation of the second proximal phalange in a second direction opposite to the first direction and toward the object;
a distal phalange having a first end portion and a second end portion, the first end portion of the distal phalange being connected to the second end portion of the second proximal phalange via a second proximal-distal pivot or rotation connection; and
a second contact phalange having a first end portion and a second portion, the first end portion of the second contact phalange being connected to the first end portion of the second proximal phalange via a second proximal-contact pivot or rotation connection, and the second end portion of the second contact phalange being connected to the first end portion of the distal phalange via a second contact-distal pivot or rotation connection that is configured to control a ratio of movement and velocity between the second contact phalange and the distal phalange, and
in response to the second contact phalange contacting the object, the second contact phalange is configured to rotate in a third direction via the second proximal-contact pivot or rotation connection toward the second proximal phalange to cause rotation of the distal phalange in a fourth direction opposite to the third direction and toward the object.

12. The robotic gripping apparatus of claim 11, wherein the first contact-distal pivot or rotation connection is a first gear connection, and the second contact-distal pivot or rotation connection is a second gear connection.

13. The robotic gripping apparatus of claim 12, wherein each of the first gear connection and the second gear connection includes a plurality of intermediary gears.

14. The robotic gripping apparatus of claim 11, wherein the second end portion of the first contact phalange has a gear surface in direct contact with a gear surface of the first end portion of the second proximal phalange, and
the second end portion of the second contact phalange has a gear surface in direct contact with a gear surface of the first end portion of the distal phalange.

15. The robotic gripping apparatus of claim 11, further comprising an electromechanical actuator configured to rotate the first proximal phalange.

16. The robotic gripping apparatus of claim 11, wherein each of the first contact phalange and the second contact phalange includes two substantially parallel plates, and
wherein the first proximal phalange is positioned parallel to and in between the two substantially parallel plates of the first contact phalange, and
wherein the second proximal phalange is positioned parallel to and in between the two substantially parallel plates of the second contact phalange.

17. The robotic gripping apparatus of claim 11, further comprising:

a first mechanical stop configured to limit a range of backward and forward rotation motions of the second proximal phalange; and a second mechanical stop configured to limit a range of backward and forward rotation motions of the distal phalange.

18. A robotic gripping apparatus, comprising:

a proximal phalange having a first proximal phalange end portion and a second proximal phalange end portion;

a distal phalange having
- a first distal phalange end portion that has a distal phalange surface with a first plurality of teeth and connected to the second proximal phalange end portion via a proximal-distal pivot or rotation connection, and
- a second distal phalange end portion; and a contact phalange having
- a first contact phalange end portion connected to the first proximal phalange end portion via a proximal-contact pivot or rotation connection, and
- a second contact phalange end portion that has a contact phalange surface with a second plurality of teeth that engages with the first plurality of teeth of the distal phalange surface; and in response to the contact phalange contacting an object, the contact phalange is configured to rotate in a first direction, to cause rotation of the distal phalange in a second direction opposite to the first direction via the contact-distal pivot or rotation connection and toward the object such that the distal phalange contacts the object.

19. The robotic gripping apparatus of claim 18, wherein a mechanical stop maintains the distal phalange in an extended position when the object contacts the distal phalange but not the contact phalange.

20. The robotic gripping apparatus of claim 18, wherein a spring mechanism is configured to exert a force in a direction that is opposite to the second direction in order to return and maintain the distal phalange in an extended position when there is no contact between the contact phalange and the object.

* * * * *